W. L. CASADAY.
Sulky-Plow.

No. 7,943. Reissued Nov. 13, 1877.

WITNESSES
Ed. S. Nottingham,
A. M. Bright.

INVENTOR
Wm. L. Casaday.
By Leggett and Leggett.
ATTORNEYS

THE NORRIS PETERS CO., WASHINGTON, D. C.

W. L. CASADAY.
Sulky-Plow.

No. 7,943. Reissued Nov. 13, 1877.

WITNESSES
Edw. S. Nottingham
A. W. Bright.

INVENTOR
Wm. L. Casaday.
By L. Eggett & L. Eggett
ATTORNEYS

THE NORRIS PETERS CO., WASHINGTON, D. C.

W. L. CASADAY.
Sulky-Plow.
No. 7,943. Reissued Nov. 13, 1877.
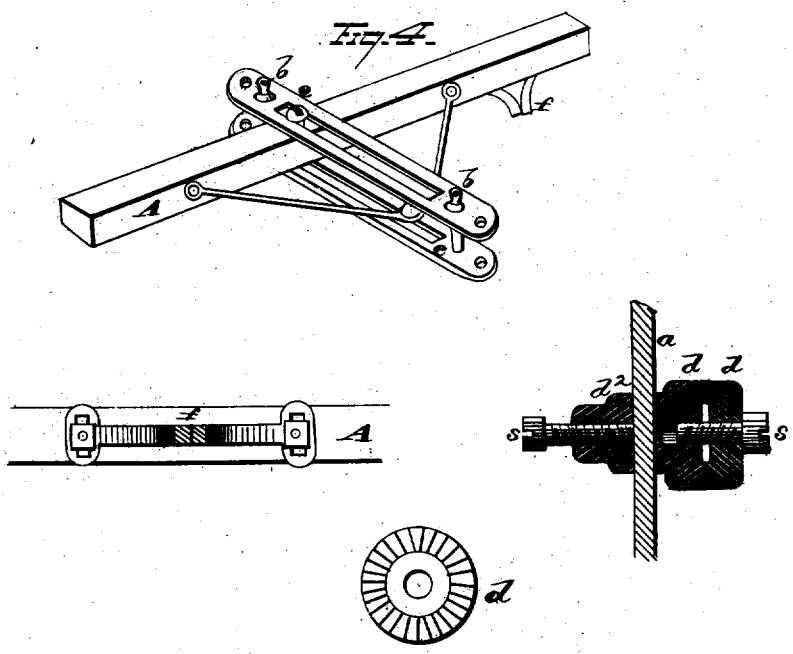
WITNESSES
Ed. S. Rottingham
A. W. Bright.
INVENTOR
Wm. L. Casaday.
By Leggett & Leggett
ATTORNEYS
THE NORRIS PETERS CO., WASHINGTON, D. C.

BEST AVAILABLE COPY

UNITED STATES PATENT OFFICE.

WILLIAM L. CASADAY, OF NEW CARLISLE, INDIANA.

IMPROVEMENT IN SULKY-PLOWS.

Specification forming part of Letters Patent No. 176,836, dated May 2, 1876; Reissue No. 7,943, dated November 13, 1877; application filed August 29, 1877.

*To all whom it may concern:*

Be it known that I, WILLIAM L. CASADAY, of New Carlisle, in the county of St. Joseph and State of Indiana, have invented certain new and useful Improvements in Sulky-Plows, of which the following is a specification:

My invention relates to plows; and consists of a sulky-plow provided with two wheels, the axle-tree of which is composed of a skeleton frame which spans the plow-beams, to which, at their rear ends, are attached the plows proper or cutters. The driver's seat is fixed upon the skeleton frame, and the depth and character of the furrow to be cut is regulated by a hand-lever or other device placed conveniently near the driver's seat.

Figure 1:
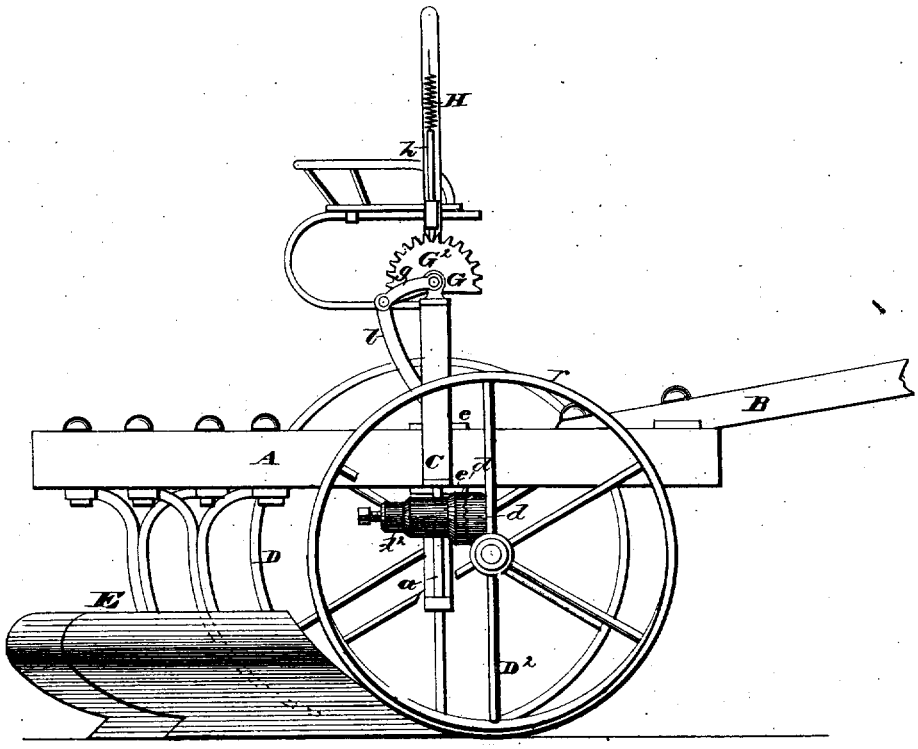
Figure 2:
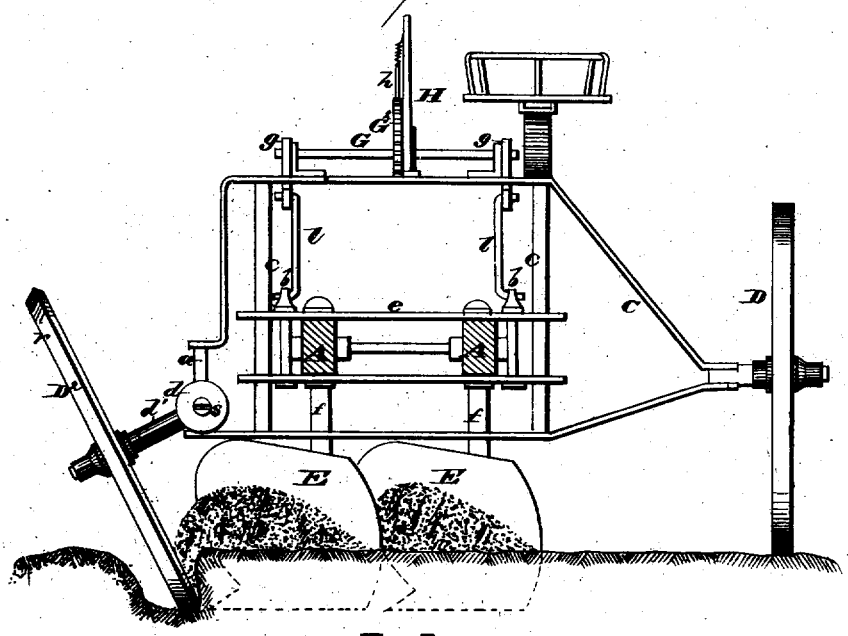
Figure 3:
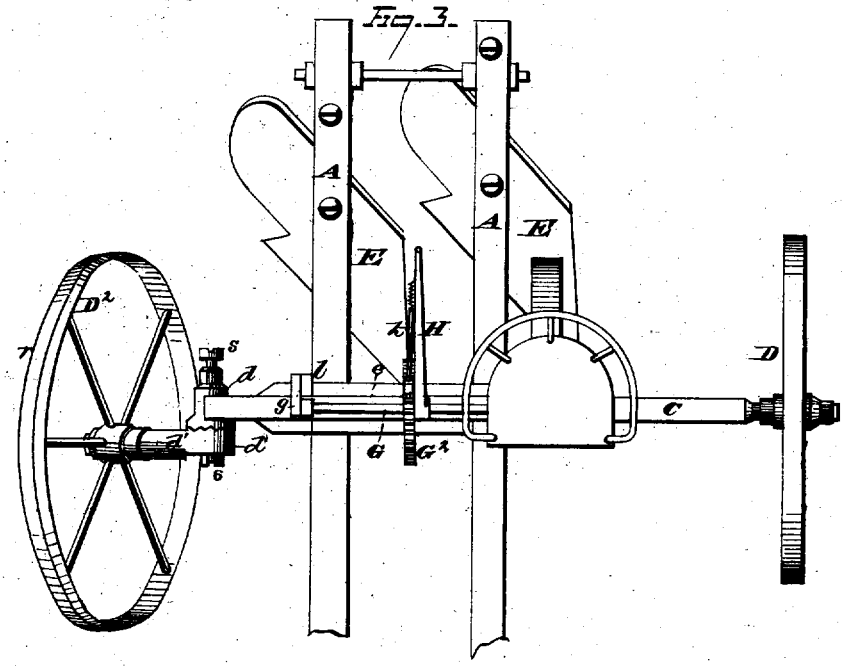

In the drawings, Figure 1 is a side elevation of a plow embodying my invention. Fig. 2 is a front elevation of the same; Fig. 3, a plan view of the same; Fig. 4, a view of a detached plow and single beam, to be used singly in place of the two plows and beams attached to the plow in the preceding figures.

A A are the beams of the plow. B is its tongue; C, the skeleton axle-tree, terminating at one end in a vertical rod, which I call the "axle," *a*. D is an ordinary wheel, and $D^2$ a wheel attached to a wheel-spindle, $d^1$, having its axle inclined downwardly from the horizontal, which inclination consequently gives said wheel a corresponding inclination from the vertical. It can, however, be adjusted to the vertical or to any degree of angularity therefrom, at pleasure, by means of the block $d^2$, ratchet-disks *d d*, and set-screws *s*. The rim of the wheel $D^2$, instead of having an ordinary flat tire, may be provided with an angular pointed rim, *r*, which shall afford a traveling surface to the tire while in its inclined or turned position.

E E are the plows proper or cutters, attached by suitable standards, preferably slotted standards, to the rear ends of the beams A A.

The axle-tree C is braced by two rod-braces, *c c*, which serve as guides for the slotted plates *e e*, to which are bolted the beams A A. To the top of the axle C is secured, in suitable bearings, a shaft, G, extended through a sector, $G^2$. To the shaft G is secured a hand-lever, H, provided with a spring-clutch, *h*, or its equivalent, which operates to hold the lever H at any desired point by meshing into teeth on the circumference of the sector $G^2$. Two arms, *g g*, on the ends of the shaft G are connected, by rods or links *l l*, to eyes in the bolts *b b*, which clamp the slotted plates *e e* together.

It can now be readily seen that by the traverse of the lever H the beams A A will be either elevated or depressed, thus regulating the depth of the furrows to be cut by the plows E E. If desired, any suitable style of mold-board or cutter may be attached to the beams A A, although the style shown in the drawings, having no land-side, is preferable. Likewise there may be employed one, two, or more plows, as desired.

Another object in giving an angular shape to the rim *r* of the wheel $D^2$ is in order that the said wheel, as it runs in the furrow, may present a square surface to the land-side or wall of the furrow. The angle at which the wheel $D^2$ is set opposes the plow's angular determination to cut, and also diminishes the friction of said plows E against the earth on the land-side. The resultant force between these opposing forces causes the plow, when drawn, to cut a furrow in a straight line forward.

The object in making the plow-standards *f f* slotted is in order to allow the plows or mold-boards E E to be set at different angles on the beams A A, such changes being desirable for plowing different kinds of soil. For plowing sod-grounds, the points of the plow should be more nearly in line with the centers of the beams A A than when plowing through mellow ground. In the latter case the point of the plow should be farther out from the center of said beams.

In order to convert this double plow into a single one, the two beams A A are removed, and also the tongue B, and the single plow shown in Fig. 4 is substituted for the double beams A A. Said plow is secured by the same bolts used for the double plows, one bolt passing through the single beam, and the other through its brace, as shown in the drawing. The tongue B is then secured to the single beam.

My entire machine is light and simple in construction, and the skeleton axle-tree, se curely braced as it is, binds the whole machine together, forming a durable, light, effective, and strong combination of parts.

What I claim is—

1. A sulky-plow, one of the wheels of which is adjustable to an inclined position from the vertical, substantially as and for the purposes described.

2. The skeleton axle C, united to the frame or axle proper by the posts *c c*, and having a fixed wheel-spindle at one end and at the other end a spindle capable of oblique adjustment, whereby the wheel is adjusted to stand vertical or at an inclined angle from the other, substantially as shown and described.

3. The skeleton axle-tree C, provided with guide-braces *c*, in combination with the slotted plates *e e* sliding thereon, and with the plow beam or beams A A, whereby the plows are adjustable to any desirable depth and width of furrow, substantially as and for the purpose described.

4. The combination of the beam or beams A A, plates *e e*, axle-tree C, links *l*, shaft G, with arms *g*, and lever H, whereby the said plow is operated, substantially in the manner and for the purpose set forth.

5. The block $d^2$, swiveled upon the axle *a* and held at any point of adjustment thereon by set-screws *s*, in combination with the wheel-spindle $d^1$, placed at right angles therewith, the two adjustably connected by ratchet-disks, whereby the wheel $D^2$ may be adjusted to various angles to the axle, substantially as shown and described.

6. In a sulky-plow, the wheel $D^2$, provided with an angular pointed rim, *r*, in combination with the frame C, having the adjustable spindle and axle *a*, and the wheel-spindle $d^1$, substantially as shown and described.

WM. L. CASADAY.

Witnesses:
L. PIERCE,
M. P. CHAPIN.